US008554596B2

(12) United States Patent
Bailey et al.

(10) Patent No.: US 8,554,596 B2
(45) Date of Patent: Oct. 8, 2013

(54) SYSTEM AND METHODS FOR MANAGING COMPLEX SERVICE DELIVERY THROUGH COORDINATION AND INTEGRATION OF STRUCTURED AND UNSTRUCTURED ACTIVITIES

(75) Inventors: John H. Bailey, Durham, NC (US); Eser Kandogan, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 2059 days.

(21) Appl. No.: 11/422,156

(22) Filed: Jun. 5, 2006

(65) Prior Publication Data
US 2007/0282659 A1    Dec. 6, 2007

(51) Int. Cl.
*G06Q 10/00*    (2012.01)
(52) U.S. Cl.
USPC .................. 705/7.12; 705/7.21; 705/7.22
(58) Field of Classification Search
USPC ...................... 705/7.12, 7.21, 7.22
See application file for complete search history.

(56) References Cited

U.S. PATENT DOCUMENTS

| | | | |
|---|---|---|---|
| 5,724,262 A | 3/1998 | Ghahramani | |
| 5,734,837 A * | 3/1998 | Flores et al. | 705/7 |
| 5,765,138 A | 6/1998 | Aycock et al. | |
| 5,774,661 A * | 6/1998 | Chatterjee et al. | 709/203 |
| 5,826,239 A * | 10/1998 | Du et al. | 705/7.26 |
| 5,850,535 A | 12/1998 | Maystrovsky et al. | |
| 5,870,545 A * | 2/1999 | Davis et al. | 709/201 |
| 5,884,302 A | 3/1999 | Ho | |
| 5,937,388 A * | 8/1999 | Davis et al. | 705/8 |
| 6,049,776 A | 4/2000 | Donnelly et al. | |
| 6,131,085 A | 10/2000 | Rossides | |
| 6,249,769 B1 | 6/2001 | Ruffin et al. | |
| 6,263,335 B1 | 7/2001 | Paik et al. | |
| 6,339,838 B1 * | 1/2002 | Weinman, Jr. | 717/104 |
| 6,363,384 B1 | 3/2002 | Cookmeyer, II et al. | |
| 6,453,269 B1 | 9/2002 | Quernemoen | |
| 6,473,794 B1 | 10/2002 | Guheen et al. | |
| 6,496,209 B2 | 12/2002 | Horii | |
| 6,523,027 B1 * | 2/2003 | Underwood | 1/1 |
| 6,526,387 B1 | 2/2003 | Ruffin et al. | |
| 6,526,404 B1 | 2/2003 | Slater et al. | |
| 6,578,005 B1 * | 6/2003 | Lesaint et al. | 705/7.14 |
| 6,675,149 B1 | 1/2004 | Ruffin et al. | |
| 6,738,736 B1 | 5/2004 | Bond | |
| 6,810,383 B1 | 10/2004 | Loveland | |
| 6,865,370 B2 | 3/2005 | Ho et al. | |

(Continued)

FOREIGN PATENT DOCUMENTS
WO    2007143516    12/2007

OTHER PUBLICATIONS

Ganesarajah, Dinesh and Lupu Emil, 2002, Workflow-based composition of web-services: a business model or programming paradigm?, IEEE Computer Society.*

(Continued)

*Primary Examiner* — Jonathan G Sterrett
*Assistant Examiner* — Stephen S Swartz
(74) *Attorney, Agent, or Firm* — Cahn & Samuels, LLP

(57) ABSTRACT

The invention allows for the integration of structured and unstructured human activities in the context of delivering one or more service. The systems and method described improve efficiency and quality of service delivery by increasing overall productivity and by providing better accountability for the actual cost of delivery.

20 Claims, 17 Drawing Sheets

(56) References Cited

U.S. PATENT DOCUMENTS

Figure 1:
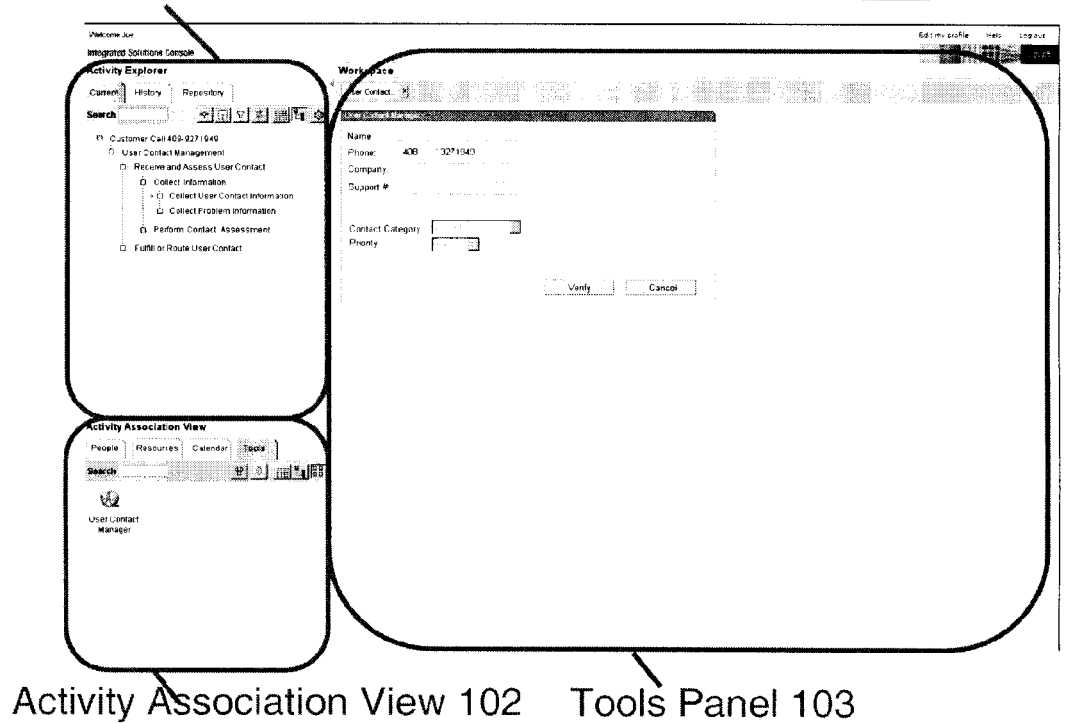

| | | | |
|---|---|---|---|
| 6,907,549 B2 | 6/2005 | Davis et al. | |
| 6,970,803 B1 | 11/2005 | Aerdts et al. | |
| 6,988,088 B1* | 1/2006 | Miikkulainen et al. | 706/14 |
| 6,988,132 B2* | 1/2006 | Horvitz | 709/220 |
| 7,010,593 B2 | 3/2006 | Raymond | |
| 7,039,606 B2 | 5/2006 | Hoffman et al. | |
| 7,114,146 B2 | 9/2006 | Zhang et al. | |
| 7,236,966 B1* | 6/2007 | Jackson et al. | 1/1 |
| 7,260,535 B2 | 8/2007 | Galanes et al. | |
| 7,293,238 B1 | 11/2007 | Brook et al. | |
| 7,315,826 B1 | 1/2008 | Guheen et al. | |
| 7,412,502 B2 | 8/2008 | Fearn et al. | |
| 7,562,143 B2 | 7/2009 | Fellenstein et al. | |
| 7,580,906 B2 | 8/2009 | Faihe | |
| 7,707,015 B2 | 4/2010 | Lubrecht et al. | |
| 2001/0047270 A1 | 11/2001 | Gusick et al. | |
| 2002/0019837 A1 | 2/2002 | Balnaves | |
| 2002/0055849 A1* | 5/2002 | Georgakopoulos et al. | 705/1 |
| 2002/0091736 A1 | 7/2002 | Wall | |
| 2002/0111823 A1* | 8/2002 | Heptner | 705/1 |
| 2002/0140725 A1 | 10/2002 | Horii | |
| 2002/0147809 A1 | 10/2002 | Vinberg | |
| 2002/0161875 A1 | 10/2002 | Raymond | |
| 2002/0169649 A1 | 11/2002 | Lineberry | |
| 2002/0186238 A1 | 12/2002 | Sylor et al. | |
| 2003/0004746 A1 | 1/2003 | Kheirolomoom et al. | |
| 2003/0018629 A1 | 1/2003 | Namba | |
| 2003/0018771 A1 | 1/2003 | Vinberg | |
| 2003/0033402 A1 | 2/2003 | Battat et al. | |
| 2003/0065764 A1 | 4/2003 | Capers et al. | |
| 2003/0065805 A1 | 4/2003 | Barnes | |
| 2003/0097286 A1 | 5/2003 | Skeen | |
| 2003/0101086 A1 | 5/2003 | San Miguel | |
| 2003/0154406 A1 | 8/2003 | Honarvar et al. | |
| 2003/0187719 A1 | 10/2003 | Brocklebank | |
| 2003/0225747 A1 | 12/2003 | Brown et al. | |
| 2004/0024627 A1 | 2/2004 | Keener | |
| 2004/0172466 A1 | 9/2004 | Douglas et al. | |
| 2004/0181435 A9 | 9/2004 | Snell et al. | |
| 2004/0186757 A1 | 9/2004 | Starkey | |
| 2004/0186758 A1 | 9/2004 | Halac et al. | |
| 2004/0199417 A1 | 10/2004 | Baxter et al. | |
| 2005/0027845 A1 | 2/2005 | Secor et al. | |
| 2005/0066026 A1 | 3/2005 | Chen et al. | |
| 2005/0091269 A1* | 4/2005 | Gerber et al. | 707/103 X |
| 2005/0114306 A1 | 5/2005 | Shu et al. | |
| 2005/0114829 A1 | 5/2005 | Robin et al. | |
| 2005/0136946 A1 | 6/2005 | Trossen | |
| 2005/0138631 A1* | 6/2005 | Bellotti et al. | 719/310 |
| 2005/0159969 A1* | 7/2005 | Sheppard | 705/1 |
| 2005/0187929 A1 | 8/2005 | Staggs | |
| 2005/0203917 A1 | 9/2005 | Freeberg et al. | |
| 2005/0223392 A1 | 10/2005 | Cox et al. | |
| 2006/0067252 A1* | 3/2006 | John et al. | 370/261 |
| 2006/0069607 A1 | 3/2006 | Linder | |
| 2006/0112036 A1 | 5/2006 | Zhang et al. | |
| 2006/0112050 A1* | 5/2006 | Miikkulainen et al. | 706/46 |
| 2006/0129906 A1 | 6/2006 | Wall | |
| 2006/0168168 A1 | 7/2006 | Xia et al. | |
| 2006/0178913 A1* | 8/2006 | Lara et al. | 705/3 |
| 2006/0184410 A1 | 8/2006 | Ramamurthy et al. | |
| 2006/0224569 A1 | 10/2006 | DeSanto et al. | |
| 2006/0224580 A1 | 10/2006 | Quiroga et al. | |
| 2006/0235690 A1* | 10/2006 | Tomasic et al. | 704/257 |
| 2006/0287890 A1* | 12/2006 | Stead et al. | 705/3 |
| 2007/0043524 A1 | 2/2007 | Brown et al. | |
| 2007/0073576 A1 | 3/2007 | Connors et al. | |
| 2007/0073651 A1 | 3/2007 | Imielinski | |
| 2007/0083419 A1 | 4/2007 | Baxter et al. | |
| 2007/0118514 A1 | 5/2007 | Mariappan | |
| 2007/0168225 A1* | 7/2007 | Haider et al. | 705/2 |
| 2007/0219958 A1 | 9/2007 | Park et al. | |
| 2007/0234282 A1 | 10/2007 | Prigge et al. | |
| 2007/0282470 A1 | 12/2007 | Hernandez et al. | |
| 2007/0282622 A1 | 12/2007 | Hernandez et al. | |
| 2007/0282644 A1 | 12/2007 | Diao et al. | |
| 2007/0282645 A1 | 12/2007 | Brown et al. | |
| 2007/0282653 A1 | 12/2007 | Bishop et al. | |
| 2007/0282655 A1 | 12/2007 | Jaluka et al. | |
| 2007/0282659 A1* | 12/2007 | Bailey et al. | 705/9 |
| 2007/0282692 A1 | 12/2007 | Bishop et al. | |
| 2007/0282776 A1 | 12/2007 | Jaluka et al. | |
| 2007/0282876 A1 | 12/2007 | Diao et al. | |
| 2007/0282942 A1 | 12/2007 | Bailey et al. | |
| 2007/0288274 A1 | 12/2007 | Chao et al. | |
| 2007/0292833 A1 | 12/2007 | Brodie et al. | |
| 2008/0213740 A1 | 9/2008 | Brodie et al. | |
| 2008/0215404 A1 | 9/2008 | Diao et al. | |
| 2009/0012887 A1 | 1/2009 | Taub et al. | |

OTHER PUBLICATIONS

BEA Systems, Inc., "BEA White Paper—BEA AquaLogic Service Bus—IT's Direct Route to SOA," printout from http://www.bea.com/content/news_events/white_papers/BEA_AQL_ServiceBus_wp.pdf, Jun. 2005.

Cape Clear Software, Inc., "Cape Clear 6.5", printout from http://www.capeclear.com/download/CC65_Broch.pdf, copyright notice 2005.

Cordys, "Cordys Enterprise Service Bus—Capabilities," printout from http://www.cordys.com/en/Products/Cordys_ESB_capabilities.htm, printed on Jun. 26, 2006.

Oracle, "Enterprise Service Bus," printout from http://www.oracle.com/appserver/esb.html, printed on Jun. 27, 2006.

PolarLake Limited, "Enterprise Service Bus (ESB) Resource Center," printout from http://www.polarlake.com/en/html/resources/esb/, printed on Jun. 27, 2006, copyright notice dated 2006.

Sonic Software, "ESB Architecture & Lifecycle Definition," printout from http://www.sonicsoftware.com/products/sonic_esb/architecture_definition/index.ssp, printed on Jun. 26, 2006.

Internet.com (http://www.webopedia.com/TERM/m/metadata.html).

Mercury, Mercury Capacity Planning (Powered by Hyperformix), 2004.

Team Quest, Capacity Planning with TeamQuest Analytic Modeling Software, printed from http://www.teamquest.com/solutions-products/solutions/planning-provis . . . on Jun. 4, 2006.

"A Capacity Planning Model of Unreliable Multimedia Service Systems", by Kiejin Park and Sungsoo Kim, Department of Software, Anyang University, Kangwha, Incheon, South Korea, Jul. 2001.

"Tracking Your Changing Skills Inventory: Why It's Now Possible, and What It Means for Your Organization", from CIO.com, Mid 2002 IT Staffing Update, Brainbench.

"Project MEGAGRID: Capacity Planning for Large Commodity Clusters", An Oracle, Dell, EMC, Intel Joint White Paper, Dec. 2004.

* cited by examiner

A new subactivity is created

SYSTEM AND METHODS FOR MANAGING COMPLEX SERVICE DELIVERY THROUGH COORDINATION AND INTEGRATION OF STRUCTURED AND UNSTRUCTURED ACTIVITIES

FIELD OF THE INVENTION

The present invention is generally related to systems and methods for managing service delivery and more particularly to the integration of structured and unstructured activities within such delivery.

BACKGROUND

Today information technology (IT) service delivery is achieved via a combination of structured and unstructured activities. In delivering services, service delivery specialists use a variety of tools for management of systems and people, problem solving, and time management.

Today, system vendors provide management software (e.g. DB2 Control Center, WebSphere Admin Console), and specialists create tools using scripts for customization and automation. The focus is typically on cost. To this end, IT service delivery centers utilize a variety of tools to track and manage incidents, problems, changes, releases, and configuration. By using formal process tools, quality, cost, and efficiency of operations are attempted to be tracked and measured in hopes of improving service delivery. Some formal process tools used by specialists, include: tools to manage their time (such as Lotus Notes Calendar), tools to find experts, tools to obtain knowledge (e.g. Google), tools to find solutions (e.g. Online Forums, Technical Support, Red Books), tools to communicate with (e.g. email, instant messaging) with colleagues, and the Information Technology Infrastructure Library (ITIL).

The increasing complexity of IT systems impacts the requirements of business that services be successfully delivered. Specialists have been able to develop their own best practices over time, often disseminated by word of mouth. Reuse of some of these customized solutions has occurred, but only to a limited degree, as it requires a deliberate effort by each specialist to document and publish the best practices utilized, tools developed, and configurations used. For this reason, it can be difficult for specialists to find particular practices and tools that they may need for a particular solution. Although search engines may help significantly in this regards, un-contextualizing and re-contextualizing solutions remains to be a serious challenge.

Improving the quality and efficiency of structured activities has received much attention, simply because the availability of workflow tracking information has provided an opportunity to improve services. However, top-down designed processes that have been implemented in workflow systems do not capture all the work conducted and time spent in service delivery, and completely miss unstructured activities. As a result, unstructured human activities are often not well understood, uncoordinated, and unaccounted for in cost estimates. Recent studies have found that considerable time is wasted on these unstructured activities. Unfortunately, without these activities accounted for, the "real cost" of delivering services cannot be quantified.

Some known IT process management tools include workflow tools such as: ticket tracking systems, time reporting tools (i.e. manual logging of time spend on a customer account), change management systems, and release distribution systems, etc. These solutions typically employ an engine where standard processes are encoded as a workflow. Workflows are often designed top-down, rigid, and define only high-level processes.

Other tools include collaboration tools, which may be comprised of general purpose tools for coordinating and collaborating towards delivering a service, e.g. email, knowledge bases, instant message system. Activity management tools may include, for example, The Activity Explorer in IBM Lotus Workplace, which provides support for human coordination and collaboration during participating in unstructured work activities, and ontology and repository for storing activity data (e.g. participants, artifacts, and resources). Administration portals may include web-based solutions that host a suite of administration tools to provide role-based views of various system configurations and tasks.

Current systems that implement one or more of the above tools for service delivery have deficiencies. Top-down design of processes limits discovery and dissemination of new emerging best practices. It is difficult or impossible for practitioners to capture ad hoc or custom extensions to workflow. Rigid processes fail to provide sufficient flexibility to describe ad hoc steps and actions that are necessary in a complex, custom environment. Reuse is limited, since only well-known high-level processes are encoded, leaving out low-level practices which is where the real expertise lies. Collaboration occurs outside of current management environments, thus, ad hoc discussions on system configuration, etc. are not preserved with the associated tools and systems. Finding expertise regarding a particular problem at hand is difficult, as tools do not capture and facilitate previous interactions of users with systems. System management tools are not integrated, thus, it is not possible to mix and match and organize low-level tasks by current activity. Environments fail to preserve the business application context tools run, thus, each user needs to initialize each tool over and over with context-related configuration. No easy and accurate way to account for time and effort spend on unstructured activities is provided.

Accordingly, there exists a need for methodologies and products that can address the deficiencies of existing solutions.

SUMMARY

The present invention enables integration of structured and unstructured human activities in the context of delivering one or more service. The present invention improves efficiency and quality of service delivery by increasing overall productivity and by providing better accountability for the actual cost of delivery. In one embodiment, user interaction techniques and architectural extensions are used to integrate activities in the context of service management.

In one embodiment, activities encapsulate both structural and unstructured work. A workspace is proposed in which activities are programmatically embodied as first class objects. In this workspace, users may, instantiate, extend, contextualize, and search the activities. The workspace integrates systems, people, time, and process management. Tools, resources, and people can be associated to an activity, or any sub-activities. As users interact in the workspace, for example, instantiate new activities from templates, provide detailed steps to perform a system management task, add (assign) people to activities, lookup resources, and/or interact with system management tools, each action is captured and saved along with the activity. As a result an activity spawned from a template structured process and extended by user actions taken in context of the structured process is captured and made available for reuse when searched for in an activity repository, which may contains all activities performed in an IT service delivery center. There can be multiple activities repositories based on location, customer, delivery center, competency, and they can be federated, or brought into a specialized service offering. Activities provide context, thus search can find related activities, based on similarity.

In embodiments, user interaction techniques may comprise one or more of the following:

+Instantiate a new activity from a structured activity template
  +Automatically instantiate activity in response to system event
  +Automatically instantiate activity from scheduled events
+Extend an activity by adding new sub-activities
  +By interacting with tools, i.e. doing things, the activity is extended organically
  +By importing/inserting (sub)activity from activity repository to current activity
  +By copying and inserting (sub)activity received via email.
  +By downloading (sub)activity from the web.
+Associate a person with a (sub)activity
  +Manually associate a person from specialists repository
  +Automatically associate a person to a (sub)activity from template structured activity
  +Automatically associate a person given a role assigned to a particular activity type
  +Automatically associate a person to an activity based on interaction context, e.g. IM, email, IP phone
  +Automatically associate a people based on previously completed activities via skills and activity matching.
+Attach a resource to a (sub)activity
  +Manually attach a resource from resource template repository
  +Automatically attach a resource to a (sub)activity as defined by the structured activity template, e.g. user contact management
  +Automatically attach a resource to a (sub)activity based on user actions taken in context of the activity, e.g. download doc from web, create word doc
+Attach a tool to a (sub)activity
  +Manually attach from tools repository
  +Automatically attach a tool by activity type
  +Automatically attach a tool based on structured activity template
  +Automatically attach a tool as a result of actions taken by user in context of activity
+Attach a scheduled event to a (sub)activity
+Select an (sub)activity to set it as current activity.
+Mark current activity status (e.g. completed, in-progress, etc.)
+Set activity urgency, priority, severity
  +Automatically escalate activity according to scheduled events.
  +Automatically assign/escalate activity by statistical analysis system severity
+Launch a tool within an activity context
  +Retrieve and automatically fill context information in tools
  +Link tool UI elements with a data path in the activity resource context resource.
+Filter people, resources, and tools by selected current subactivity
+View current and past activities of your own
+View current and past activities of all specialists in an organization
+View status of (sub)activity
+Synchronize activity with activity participants
+View people, resource, tools associated with a (sub)activity.
+View current and past actions within an activity.
+Capture and save actions to current activity
+Save current activity to activity repository automatically when completed.
+Save current activity as template
+Browse activities at different levels of detail
+Browse activity history
  +By name
  +By date/time
  +By role
  +By person
+Search activity history
  +By keyword
+Browse activity repository
  +By name
  +By date/time
  +By role
  +By person
+Search activity repository
  +By keyword
  +By similarity to current (sub)activity, using context.
+Browse and Search specialist repository
  +By keyword
  +By name
  +By project
  +By role
  +By expertise
+Browse and Search resource template repository
  +By keyword
  +By name
  +By activity type
  +By resource type
+Browse and Search tool repository
  +By keyword
  +By name
  +By activity type
  +By tool type
+Monitor activity repository
  +By activity type
  +By activity urgency, priority
  +By activity status
  +By associated person name
  +By scheduled event date
  +By custom pattern
+Create system event monitors
  +By custom patterns
+Associate a default activity to be instantiated in response to system event monitor
+Rearrange/reorganize the activity structure
  +Create aggregate activities
    +from all current activities by filter and restructuring activities
    +from past activities
  +Filter activities
  +Apply transformation
+Create a report/alerts for activity
+Analyze activity repository for efficiency, quality, and costs.

In embodiments, architectural extensions may comprise one or more of the following:

Activity Templates
Activity Templates Repository
Activity Agent
    Action Capture Service (part of Activity Agent)
Activity Analysis Service
Activity Pattern Recognition Service
Activity Repository Search Engine
IT Activity Ontology
    Activity Descriptors
Role/Specialist Repository
Tool Repository
Template Resource Repository
Calendar Engine
System Event Notification Engine
Reporting Service
Activity Notification Engine
Activity Context Resource In one embodiment, a computer implemented method of managing service delivery includes the steps of importing and instantiating standard structured workflows as work activities; and extending the instantiated work activities with ad hoc actions taken by one or more activity participant. The ad hoc actions may include: composing and sending mail; composing and sending messages, adding calendar entries; using tools; using a phone, using a browser, and creating electronic documents. The ad hoc actions may be mediated via one or more an activity agent.

In one embodiment, a computer implemented method of accounting for unstructured activities includes a step of analyzing unstructured activities in a service delivery environment. The method may further include a step of analyzing structured activities. With the method, an aggregate cost of participants in one or more activity may be calculated, for example, by an activity analysis service. With the method, completion times of one or more on-going activity may be estimated, for example, by an activity analysis service. With the method, common inefficiencies in one or more activity may be identified, for example, by an activity analysis service. With the method, ad hoc activity patterns in one or more activity may be identified for potential inclusion in or promotion to structured workflows, for example, by an activity pattern recognition service. With the method, one or more ad hoc activity pattern may be identified for potential automation, for example, by an activity pattern recognition service.

In one embodiment, a computer implemented service delivery system may comprise a plurality of instantiated activities, wherein the activities are embodied as first class objects; an activity agent; and an activity repository, wherein the activity agent and the activity repository are operatively coupled to exchange information with each other regarding the plurality of activities. In one embodiment, the activity repository may store resources that are created manually or automatically in the context of the one or more activity. In one embodiment, the activity repository may be searched manually or dynamically at instantiation of the one or more activity, and in response to the search a set of previously complete activities may be returned to an activity agent user to populate/extend the one or more activity. In one embodiment, the activity agent receives, classifies, and propagates events from client actions associated with an active activity, and the activity agent shares the events with other participants in the active activity. In one embodiment, the activity agent retrieves structured or general activity templates and pre-populates the templates during instantiation using one or more of the following sources of information: a user/group directory server, a calendar event; event data and event source data. In one embodiment, the activity agent assembles activity data and structures the data for presentation and user manipulation. In one embodiment, the activity agent captures and adds structured and ad hoc actions and data to the one or more activity. In one embodiment, the activity agent captures ad hoc user actions, and if unassociated with current activities, prompts the user to associate the actions.

In one embodiment, a computer program product comprising a computer usable medium including computer usable code for launching one or more tools that are contextually part of an activity, comprises: computer usable code for passing relevant activity information to the one or more tools, and passing information from the one or more to tools back to an activity agent for inclusion in an activity data structure residing in an activity repository.

In one embodiment, a system for storing role and specialist definitions can be dynamically searched and associated with people for inclusion in an activity at time of instantiation, or at later time, manually by the user.

Other embodiments, benefits, and/or advantages will become apparent upon a reading for the figures, description, and claims that follow.

FIGURES

Figure 2:
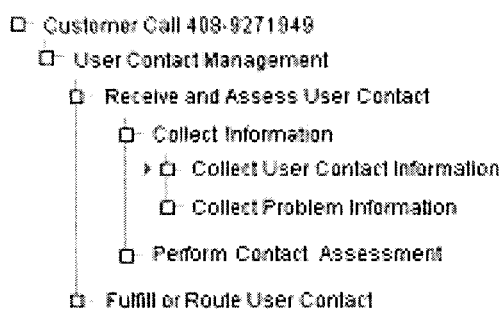

In FIG. 1 there is seen a representation of an integrated administration workspace comprised of an Activity Explorer, an activity Association view, and a Tools Panel In FIG. 2 there is seen a representation of a Current Activity view.

Figure 3:
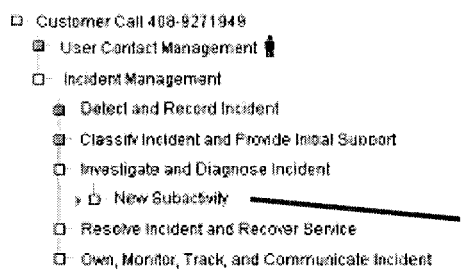

In FIG. 3 there is seen a representation of sub activities.

Figure 4:
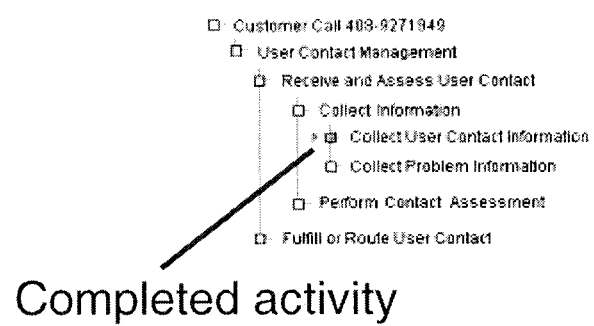

In FIG. 4 there is seen a current activity that is marked complete.

Figure 5:
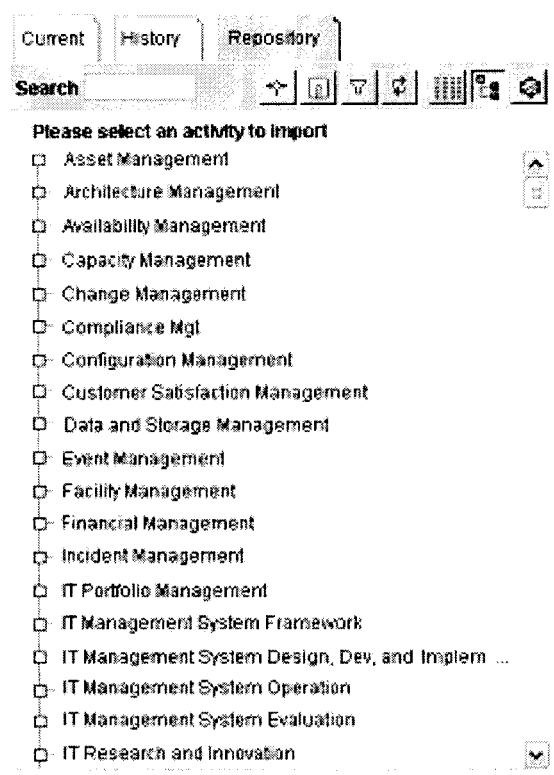

In FIG. 5 there is seen a representation of an Activity Repository view.

Figure 6:
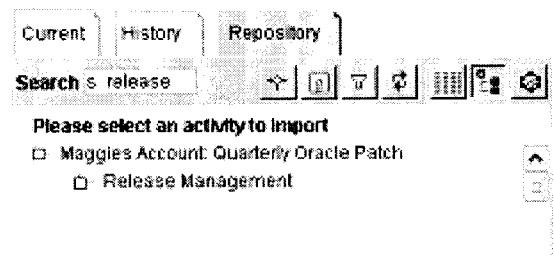

In FIG. 6 there is seen a representation of a search within an Active Repository view.

Figure 7:
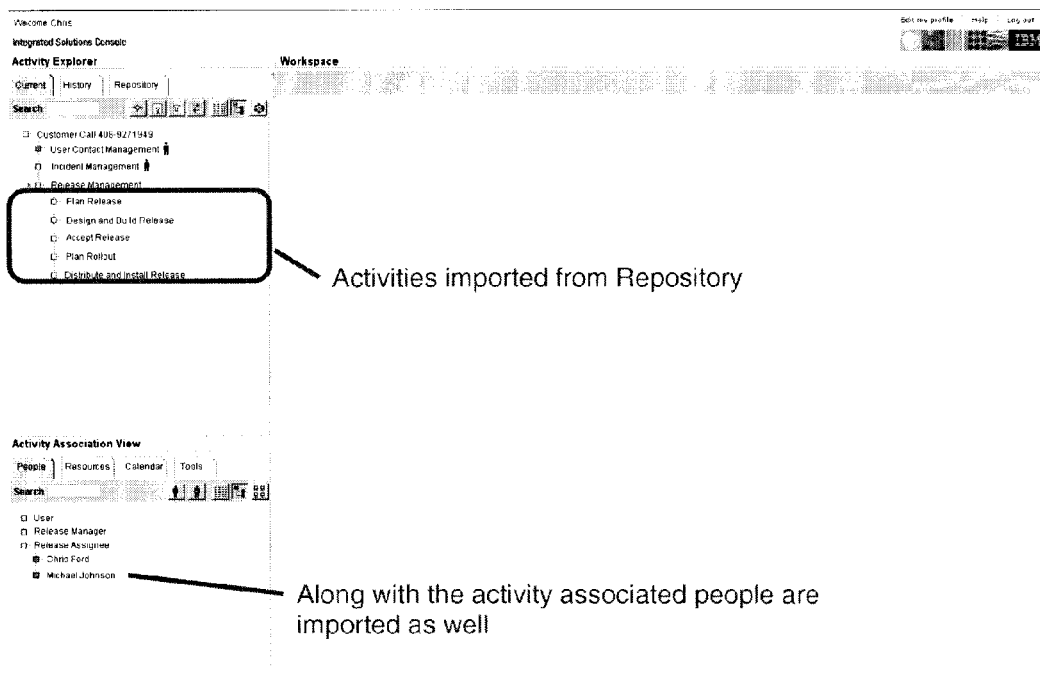

In FIG. 7 there is seen a representation of importing a new activity into a current activity.

Figure 8:
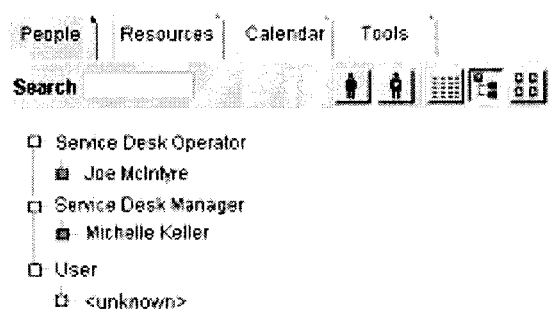

In FIG. 8 there is seen a representation of a People view.

Figure 9:
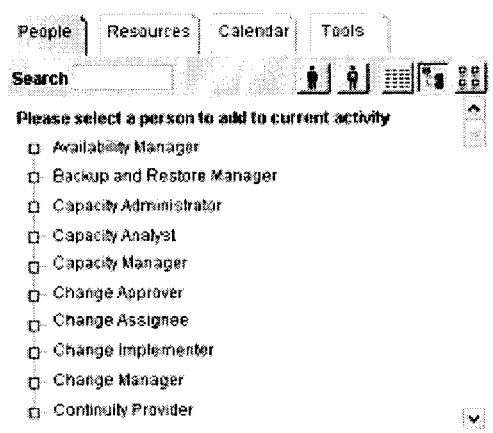

In FIG. 9 there is seen a representation of adding a person to an activity manually.

Figure 10:
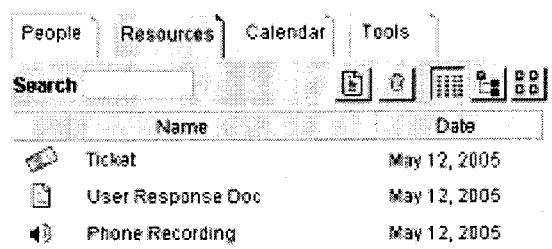

In FIG. 10 there is seen a representation of a Resources view.

Figure 11:
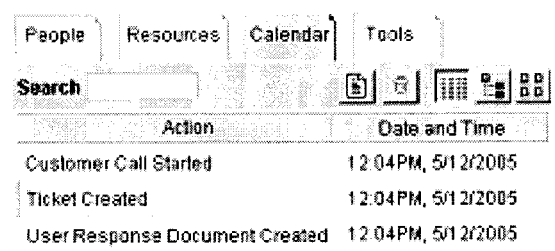

In FIG. 11 there is seen a representation of Calendar view.

Figure 12:
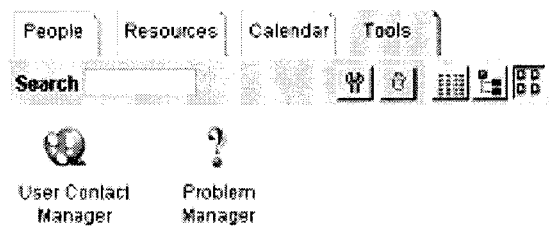

In FIG. 12 there is seen a representation of a Tools view.

Figure 13:

In FIG. 13 there is seen a representation of a Tool Repository.

Figure 14:
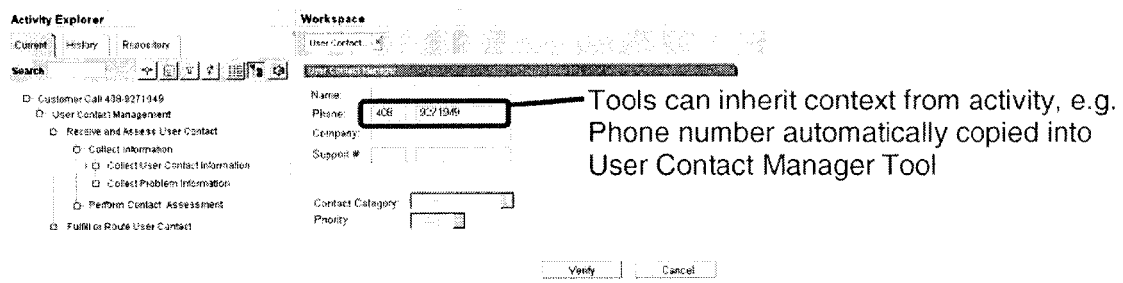

In FIG. 14 there is seen representation of a Tools panel.

Figure 15:
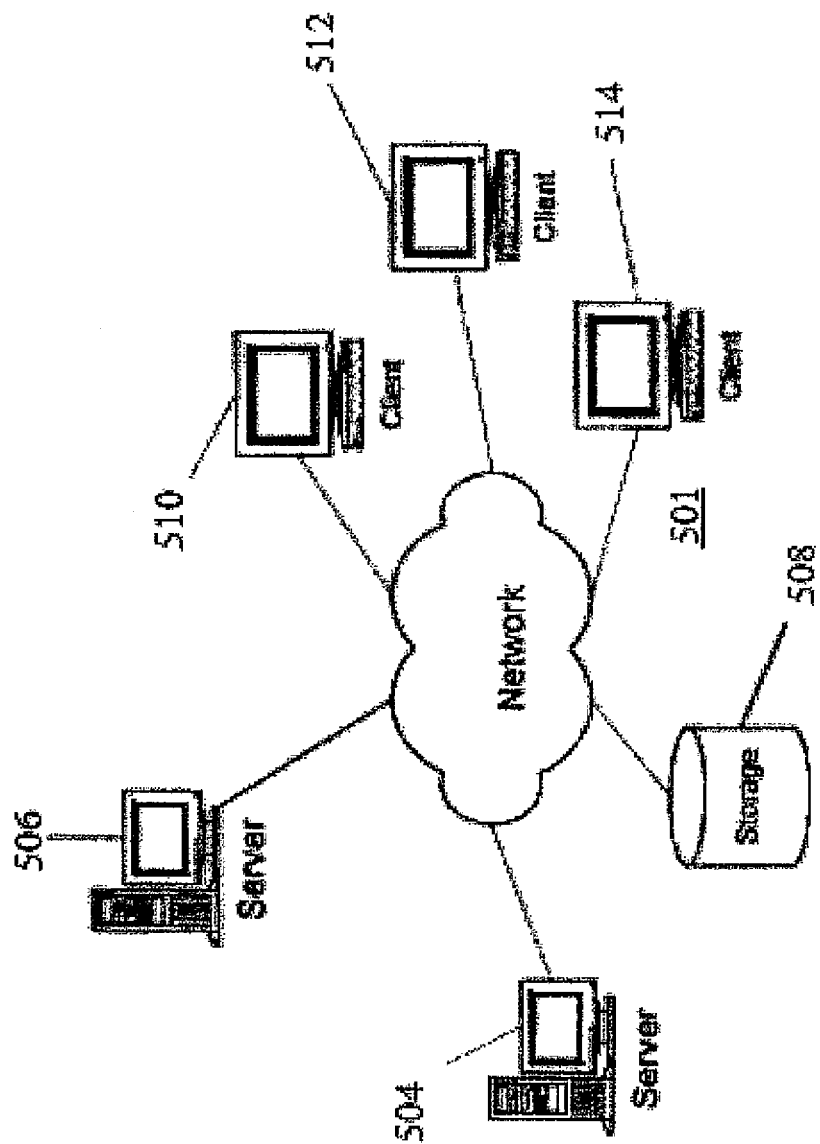

In FIG. 15, there is seen a representation of a system wherein and wherewith one or more embodiments of the present invention may be implemented.

Figure 16:
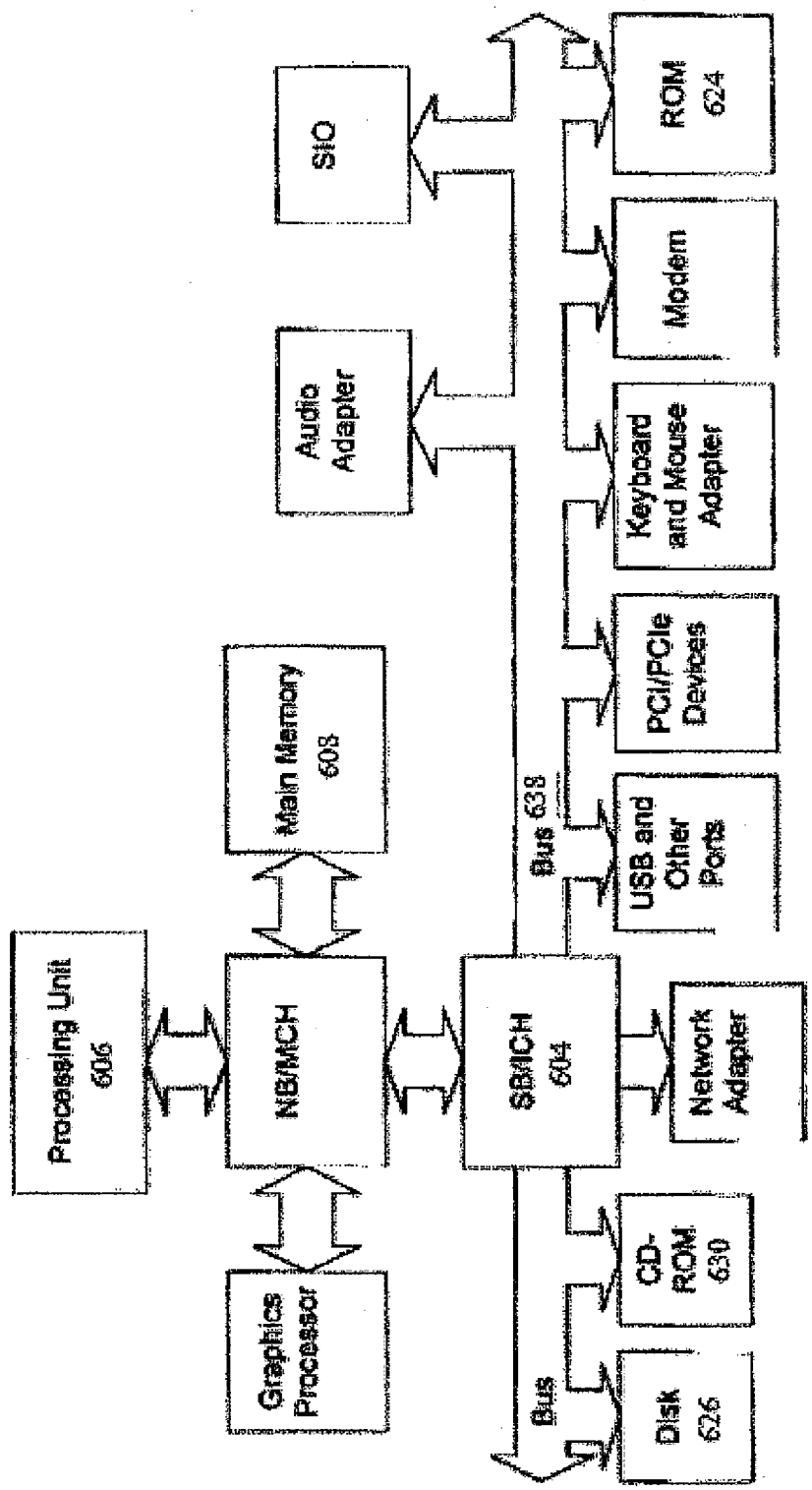

In FIG. 16 there is seen a representation of an architecture for implementing one or more embodiments.

Figure 17:
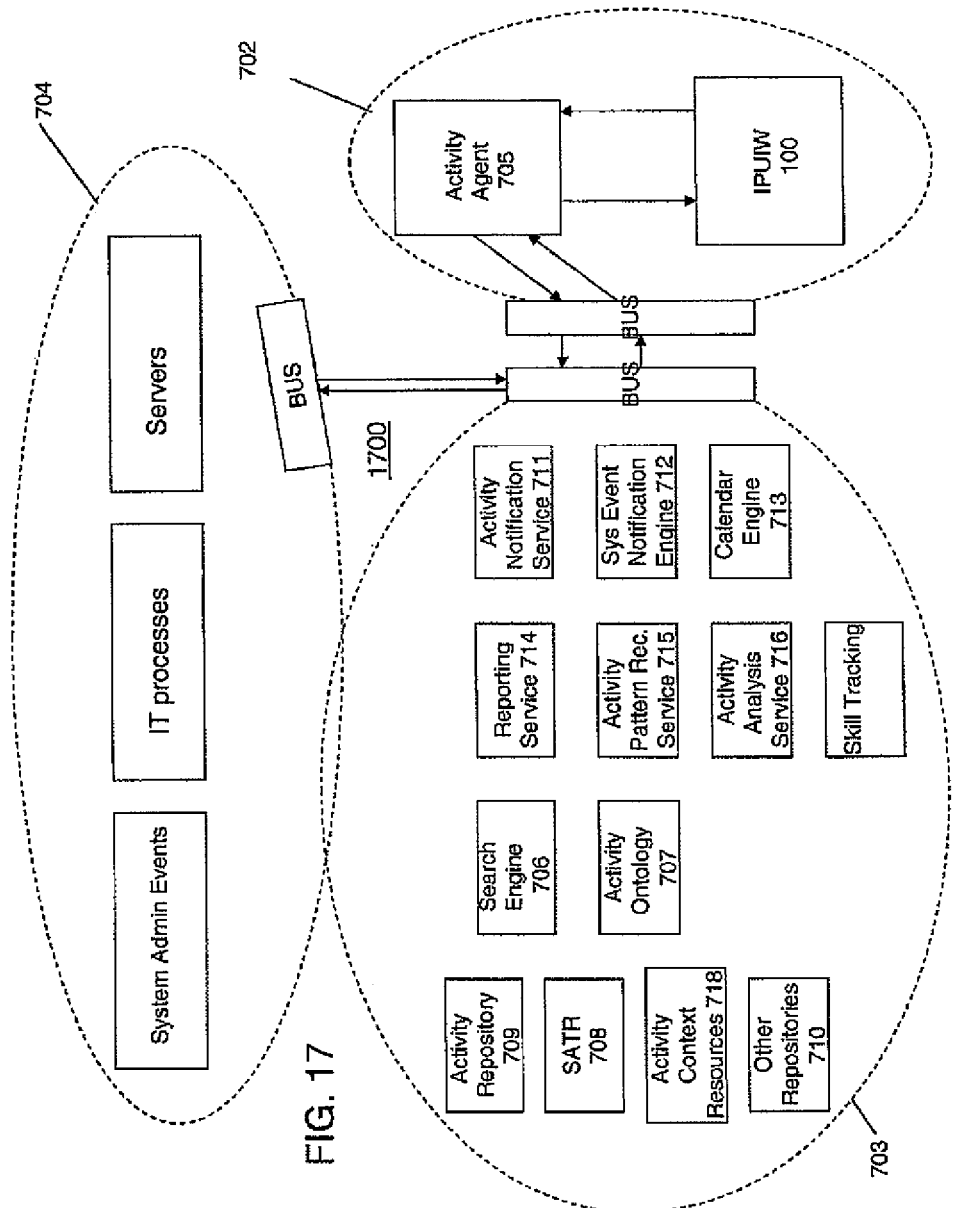

In FIG. 17 there is seen in block diagram form a representation of an embodiment for managing IT service delivery through coordination and integration of structured and unstructured human activities.

DESCRIPTION

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Embodiments for managing Information Technology (IT) Service delivery through coordination and integration of structured and unstructured activities are described herein. An activity presentation system and interaction methods for managing and executing activities is enabled. In a preferred embodiment, inventive aspects and embodiments are provided in an integrated presentation and user interaction workspace as part of a client server/model.

Referring to FIG. 1, there is seen a representation of an integrated presentation and user interaction workspace. In one embodiment, the integrated presentation and user interaction workspace 100 is deployed on an activity client, which will be described further below. In the preferred embodiment, an integrated presentation and user interaction workspace comprises an Activity Explorer 101, an Activity Association view 102, and a Tools Panel 103. In one embodiment, Activity Explorer 101 may display Current and History activities (for example, via use of a tab) of a user. Within the Activity Explorer 101 there may also be an Activity Repository (for example, accessed via Repository tab) that displays activities in an organization.

Referring now to FIG. 2, and other Figures as needed, there is seen a representation of a Current Activity view as made accessible via a tab in Activity Explorer 101. Although there may be many possible ways to represent an activity, including via graphical and tabular representations, in a preferred embodiment, a representation comprises a simple hierarchical listing of activities.

In this representation, activities are rendered as a tree, with each node of the tree, containing the name of the activity, and users may browse the activities by simple expanding and collapsing nodes. Each node in the tree, except the leaf nodes, is expandable and collapsible to show and hide subactivities of the selected node, by clicking on the expand/collapse box next to the activity name. Users may also select a node to make it the current activity. In one embodiment, an indicator mark may be displayed next to a expand/collapse box to indicate the current activity. When the current activity is selected, the activity association view and tools panel may be updated to show the people, resources, tools, and calendar items related to a current activity.

Referring now to FIG. 3, and other Figures as needed, there is seen a representation of the creation of a sub activity. When working with an activity, users may often have the need to create new sub activities to detail specific tasks needed to complete an activity. This is often the case when an activity is instantiated from a template activity in the repository. In one embodiment, users may contextualize and extend the activity for the current task at hand by adding further tasks to do and customizing existing activities.

As users work with an activity, resources created and used (e.g. documents, spreadsheets, web pages), people contacted and collaborated (e.g. through IM, e-mail, or IP phone), and tools used (e.g. through user actions) may be associated with the current activity automatically. Each of these actions may be captured into a repository and also recorded on a calendar with respective times of start and completion.

Subactivities can also be imported from an activity template repository. In one embodiment, a specialist that sees a need to perform a typical subactivity may reuse an activity template already created for this work and saved into the repository. Either through browsing or searching the activity repository, users may find an activity and insert it in the appropriate location into the current activity.

Subactivities may also be received by email, or found on web documents. In these cases, activities in these documents may be in the form of activity descriptors, which define activity structure and associated elements. Copying and pasting them into the current activity in the workplace may be used to automatically copy the copied activity structure over.

Each (sub)activity may be set with a status that describes the urgency, priority, severity, and completeness. While some of these status indicators can be set manually, it may also be possible to automatically update an activity status. One way to do this is to automatically escalate an activity based on a scheduled event. For example, a scheduled backup activity can increase the priority of a system configuration activity that is required to precede the backup work. Another way to update activity status may be through statistical analysis of actions within an activity. It is possible to set the percent complete status of an activity based on the actions already carried out and comparing them to similar activities performed in the past (from an activity repository). In another embodiment, escalation of the priority of an activity may be performed automatically if statistical analysis identifies that based on past activities current activity is not going to be completed in time according to the service level agreement.

Referring now to FIG. 4, and other Figures as needed, there is seen a representation of a current activity that is marked complete. Once users complete an activity by interacting with the people, resources, tools, etc. of the current activity, it may be marked complete. In this manner, the status of the activity may be recorded and synchronized to all other participants of the activity. Current activities may be automatically saved to the repository both when users work on the activity and when it is completed. However, completed activities may also be additionally saved as a template activity, creating a new activity type and structure that can serve as a model for future activities.

Activities can also be automatically instantiated in response to system events (e.g. User Contact Activity in response to Support Phone Call). Users may create custom system event monitors and associate a default activity from an activity template repository. Once event monitors are active and the pattern is observed, the default activity associated with the event may be automatically instantiated.

In one embodiment, another way to instantiate an activity may be to schedule events in a Calendar view (via use of a tab in the Activity Association view 102). An event may be created for a future date and time and associated with a default activity from the activity template repository. Similar to system event monitors, when the time comes, the associated activity may be automatically instantiated.

In one embodiment, an Activity History view may be used to view past activities of a person. The Activity History view can be used to browse and search past activities. Activity History can be browsed and searched by keyword, name, persons involved, dates of the past activities, etc. Using the activities found in the Activity History specialists may refer to prior actions, examine past solutions, contact prior collaborators, etc. If desired (sub)activities from the History view may be imported/inserted into the current activity.

Referring now to FIG. 5, and other Figures as needed, there is seen a representation of an Activity Repository view. In one embodiment, an Activity Repository (accessed via use of Repository tab) may contain all current and past activities within an organization. One purpose of the repository can be to have a single location to capture organizational knowledge within a group, so that practices can be shared and reused. By default the activities in the repository may be organized by activity type and in a hierarchical fashion. Other representations are also feasible, such as organized by activity name, date, project, or person/role, etc.

Referring now to FIG. 6, and other Figures as needed, there is seen a representation of a search within an Active Repository view. The Activity Repository may be searched in a number of ways. A keyword-based search may be used for finding activities based on matching a keyword with content on the activity structure (name, etc.), resources, people, and tools. Alternatively, a repository search may enable a similarity-based search. In one embodiment, given a current activity, the repository search may return matches based on similarity of activity structure, content, people involved, tools used, etc. This may find benefit, as specifying a search query can be difficult at times, particularly in complex IT tasks.

Referring now to FIG. 7, and other Figures as needed, there is seen a representation that illustrates importing a new activity into a current activity. Given the various ways to browse and search the repository, users can find a relevant past activity and perhaps refer to prior actions performed within the activity, examine solutions, find collaborators, etc. If desired, a past activity found in the repository can be used as a template for instantiating a new activity, or parts of it can be imported/inserted into a current activity.

Because activities in the repository may also contain current activities within a group, users may examine current activities within a group. If higher level planning is needed, users may create aggregate activities by assembling a higher-level activity with parts referring to existing current activities. For example, a manager responsible for all activities in a project might create a project delivery activity to track all activities within the project. Other transformations of the current activities such as filters and transforms are also possible. Filters may iterate over all activities and subactivities and create an aggregate activity consisting of (sub)activities matching a filter, creating a custom pattern. Transforms are more flexible constructs that allow a user to create a new activity with operators such as iterate_over, match_pattern, create_node, etc. that examine all (sub)activities in the repository and create a new activity structure (similar to XSLT language).

Users may also create monitors over the activity repository to track activities by type, urgency, priority, status, person name, and custom pattern. A monitor may track updates to the repository and dynamically trigger an alert when monitor condition is satisfied. An alert as simple as an email or pager notification may also automatically instantiate a new activity. For example, a manager could build a monitor that tracks all change management activities and be notified when they are done.

An enhanced monitor type may be provided that is a report that creates document with content, charts, etc. driven by data from the activity repository. Reports may be dynamically updated in response to monitor triggers. Reports can utilize statistical packages for analyzing cost, efficiency, and quality. In one embodiment, data from the repository may be processed by these statistical packages to arrive at aggregate metrics which are then rendered in the report documents.

Referring back to FIG. 1, there is represented an Activity Association view 102. Activity Association views may show people, resources, calendar entries, and tools available associated with the current activity. The content of the views may be updated as users select different activities in the hierarchy, thereby creating a work context. In a default case, all items (i.e. people, resources, etc.) not associated directly with the selected current activity may be filtered out, leaving only those that are directly associated with the activity. Users may selectively choose to show all associated items of the selected current activity and its subactivities or just the selected activity, as in the default.

Referring now to FIG. 8, and other Figures as needed, there is seen a representation of a People view. In one embodiment, in a People view (accessed via a People tab in an Activity Association view), users may see people associated with the activity, along with their roles. In the default view, associated people are shown in a hierarchical organization of roles. Alternative renderings are also possible, such as iconic representation of people, pictures, relation-based hierarchy (e.g. organizational, project-based, etc.) instant message status, participant project responsibility, expertise, etc. Various actions may also be connected to entries in the people view, such as instant messaging with selected person, view participant activity tasks, status, and history, assign tasks to participants, etc.

Referring now to FIG. 9, and other Figures as needed, there is seen a representation of adding a person to an activity manually. In one embodiment, one can either search for or browse a specialist repository (by name, project, role, and expertise) and add to an activity.

Adding a person to an activity may be performed in other ways as well. In one embodiment, when an activity is instantiated from the template activity repository, people/roles associated with the activity may be automatically associated with the newly associated activity. In one embodiment, a role that is associated with a subactivity that is imported (from activity repository or elsewhere) may be matched during instantiation. For example, when a service desk operator, Joe, instantiates a new activity from a User Contact Activity template, automatically a Service Desk Manager may be associated with the activity and matched to the Joe's manager. Collaboration and communication action in the context of an activity may also be automatically associated the parties involved to the current activity. For example, when a specialist consults an expert in the course of an activity, the expert may be automatically associated with the activity. In other embodiments, an expert might not be known at the time, but may be searched through the skills and activity matching utility. In one embodiment, the expert may be found based on experience with similar activities by crawling an activity repository and performing a similarity matching.

Referring now to FIG. 10, and other Figures as needed, there is seen a representation of a Resources view. In one embodiment, a Resources view (accessible via a Resources tab) may show all the resources associated with the current activity. As resources are created, either through the use of the tools, automatically from the repository (from templates or by activity type), or manually created from resource template repository, they may be added to the Resources view with the appropriate time stamp. A default representation of the resources may be a table with various columns of resource properties, such as resource name, creation-modification time, length, size, etc. Alternative representations such as a hierarchical view by resource type, activity type, etc. are also possible. A hierarchical view may supports user to browse the Resource view. Searching the Resource view may also be possible to allow users to find resources by keyword matches to resource name, etc. Various actions can be connected to resource entries, such as view/edit resource, (un)lock resource, view history, etc. New resources can be added from the resource repository through either search or browser interfaces. In one embodiment, the resource template repository may be browsed by resource name, type, and by resources organized by activity type. A search interface may allow users to find resources from the resource template repository.

Referring now to FIG. 11, and other Figures as needed, there is seen a Calendar view. In one embodiment, a Calendar view (accessible via a Calendar tab) may be used to view past actions associated with an activity and to view and schedule future scheduled events/to-dos and deadlines. A basic representation may be a tabular representation of actions along with start date and time and duration of the actions. Alternative representations are possible, including daily, weekly, and monthly calendar-like representations and that time-line representations that could facilitate easier scheduling and planning.

As users interact within the context of the current activity, tool actions, people interactions, resources created and modified may be added to the Calendar view. Each such action may be added along with the date and time of action for two purposes to achieve better cost measures and to be able to reuse an activity. With a complete list of all actions carried out in an activity, one can analyze with much greater accuracy. Such analysis can be performed to build models of work, which can be used in cost analysis and planning. Because all actions may be taken into account, much better models of where time is spend, how much time activities take, what is involved in carrying out a particular type of activity, and where things can be improved. In the Calendar view it may also be possible to schedule events and to-dos. These can be as simple as reminder notifications and as complex as customer monitors that can trigger activity instantiations. For example, a change management activity that is taking longer than past the deadline could be automatically escalated, assigned to another person, or used to instantiate a management tracking activity, for example, a recurrent event may instantiate a system health checkup activity every month.

Referring now to FIG. 12, and other Figures as needed, there is seen a representation of a Tools view. In one embodiment, tools associated with an activity may be shown via a Tools view (accessible via a Tools tab). In one embodiment, tools may be associated with an activity either manually by launching the tool in the workspace from the tool repository, or automatically from activity templates or by activity type. Various representations of tools are possible, including iconic and tabular listings, perhaps showing tool popularity, last use, etc. Tools launched from the Tools view may displayed in a Tools Panel.

Referring now to FIG. 13, and other Figures as needed, there is seen a representation of a tool repository browsed by tool name, type, and by activity type. In one embodiment, a search interface may be provided to enable users to find tools in the tool repository.

Referring FIG. 14, and other Figures as needed, there is represented a Tools panel. In one embodiment, users may launch tools from a Tools view, whereby the launched tool is displayed in a Tools Panel 103. In one embodiment, Tools Panel 103 may mimic a set of tool windows. Tool windows can be arranged, minimized, and resized, pretty much like in all window managers. One difference may be that only those tool windows are displayed that are associated with a current activity. In one embodiment, Tools Panel 103 may mimic a multi-desktop window manager, with each desktop corresponding to a (sub)activity. In one embodiment, while by default only tools that are associated with the current (sub) activity are displayed on the tool panel, users may set it in such a way that tools belonging to sub activities of the current activity are also displayed.

In one embodiment, each tool in a Tools Panel 103 may be launched in the context of the current activity. What this means is that tools can automatically set data in certain UI elements from a default activity context resource (essentially an XML document). A default activity context resource may be associated with every (sub)activity so as to store contextual information. In one embodiment, tools can read and write to a context resource by interactions that are transparent to the tool user. Users may also manually edit a context resource. For example, reconsider the user contact activity. A user contact activity may be automatically instantiated when the user receives a customer call, and a default activity context resource may be created automatically that contains the customer phone number. If tools are launched in the context of this activity they can read in this value (i.e. customer phone number) and automatically fill in corresponding fields. Tool developers (as well as end-user specialists) can associate UI elements in the tool to link to an XML data path in the activity context resource. Thus, if the activity context contains the data referred by a path of the UI element in a tool, its value may be automatically set from the activity context resource. If the value is lacking and the user manually enters the value in a UI element, the user entered value may be synchronized back to the activity context resource.

Referring now to FIG. 15, there is seen a representation of a network or system, wherein one or more clients 510, 512, 514 are operatively coupled to communicate with one or more servers 504, 506, and one or more storage devices 508. Client/server may describe a relationship between two computers/programs in which one computer/program, the client, makes a request for service to another computer/program, the server, which fulfills the request. Although the client/server idea can be used by programs within a single computer, it is applicable to a network of computers as well. In a network, the client/server model provides a convenient and efficient way to implement and interconnect needed hardware, firmware, and software that may distributed across different locations. One or more embodiments disclosed herein can be deployed within or as part of system 501, as could be implemented by those skilled in the art.

Referring now to FIG. 16, and other Figures as needed, there is seen a representation of possible elements with which embodiments of the present invention may be implemented. In some embodiments, a client, a server, storage and/or other devices(s) may comprise one or more of the following: a processor 606, a memory 608 (e.g., a volatile memory device), storage devices 624, 626, 630, and other circuits, as are known and able to be implemented by those skilled in the art. In one embodiment, storage and/or memory devices may be embodied as a non-volatile memory device, magnetic disk drive, optical disk drive, tape drive, etc. Storage and/or memory may as well comprise an internal storage device, an attached storage device, and/or a network accessible storage device. In one embodiment, storage and/or memory may be embodied as a non-volatile memory device (e.g., EEPROM, ROM, PROM, RAM, DRAM, SRAM, flash, firmware, programmable logic, etc.). In one embodiment, the present invention may be deployed and implemented as computing instructions by a person or automated processing integrating computer-readable code into a computing system, wherein the code in combination with the computing system is enabled to perform the operations of the described embodiments. Other possible elements know to those skilled are represented and may be implemented as needed by those skilled in the art.

Referring now to FIG. 17, and other Figures as needed, there is seen in block diagram form a representation of a system for managing IT service delivery through coordination and integration of structured and unstructured activities.

In one embodiment, system 1700 may comprise one or more of an activity client 702, and activity backend 703, and other systems 704. In one embodiment, activity client, 702, activity backend 703, and systems 704 may be embodied in or as one or more of a processor 606, a memory 608, storage 628, and other hardware, firmware, and software known to, and able to be implemented by, those skilled in the art.

In one embodiment, a system for managing IT service delivery through coordination and integration of structured and unstructured human activities comprises one or more activity client 702, one or more activity backend 703, and one or more other system 704. Communication and interactions between the one or more activity client, one or more activity backend, and one or more other system may occur via one or more bus or other communication medium as could be implemented by one skilled in the art. In a preferred embodiment, an integrated presentation and user interaction workspace (IPUIW) 100 is deployed on all participating clients. In a preferred embodiment, users may communicate via their deployed integrated presentation and user interaction workspace 100 to effectuate the advantages and benefits of the present invention.

In one embodiment, system 704 may comprise one or more server, For example, an industry proprietary (e.g. Windows Directory Server) or industry standard (e.g. LDAP) user/group directory server as is known to those skilled in the art. One or more embodiments of the present invention could be implemented by those skilled in the art to use information in system 704.

In one embodiment, activity agent 705 is deployed on an activity client 702 and is responsible for coordinating back-end architectures and events with front-end actions and events. In a preferred embodiment, an activity agent 705 is installed and active on all participating activity clients. The activity agent 705 may enable functions that include: receiving/capturing events from various sources in a user work environment and from external architectures (as with an Activity Capture Service); classifying events by type and origin; and initiate actions based on event types and origins, for example: 1) retrieving information from directories, template repositories, activity repositories, 2) assembling information from various locations and send to the presentation layer, 3) refreshing a presentation layer, 4) sending (or populating) information to an activity repository, template repository, and 5) associating client events with an activity (automatically or with UI dialog.

In one embodiment, an activity backend 703 is deployed across one or more server. In one embodiment, an activity backend 703 may have deployed thereon one or more of the following: an activity repository 709, structured activity template repository (SATR) 708, an activity ontology 707, an activity analysis service 716, an activity pattern recognition service 715, a search engine 706, a calendar engine 713, a reporting service 714, a system event notification engine 712, an activity notification engine 711, an activity context resource (ACR) 718, a tool repository 710, a resource repository 710.

In an exemplary embodiment, activity repository 709 may be modeled on the current Resource Description Framework (RDF) activity repository used by Lotus Workplace and the Lotus Activity Explorer, and may be embodied by API's and services. Lotus Workplace is a set of customizable online work collaboration products from IBM's Lotus division, which those skilled in the art would be able to incorporate and use to enable embodiments of the present invention.

Activity backend 703 may also include one or more structured activity template repository (SATR) 708. A structured activity template may be based on activity repository structures, and may use related API's and services. The differences may exist in the actual structure by introducing a new template element. In one embodiment, structured activity templates provide a structure and flow as are described by existing orchestrated workflows. They may be used to initiate activity instances that will capture both structured and unstructured human actions and associated resources, tools, people, and other descriptive data. In one embodiment, an activity template may use a canonical XML-based format of representing structured workflow, and may utilize tools that convert propriety workflow formats to canonical format either in batch or dynamic mode.

In one embodiment, structured activity instances may be instantiated in a user interface in UPUIW 100 and in activity repository 709. An activity in it's many aspects may be represented in the user interface, which may provide UI elements for displaying and supporting interaction with the activity. An activity instance may be converted to an RDF format and stored in the activity repository 709, and the structured activity instance may be updated using an instance created from that activity template.

In a preferred embodiment, an activity ontology 707 is implemented using extensions of the current activity ontology used by those skilled in the art in the Lotus Activity Explorer. Specific kinds of activity resources based on current standard or custom IT related processes may be implemented. Activity resources may include, but are not limited to IT service provider roles and responsibilities, e.g. approver, change manager, resource configuration and state, process state, client account information. In one embodiment, activity descriptors may be used to capture properties of IT activities described in the activity ontology 707.

In one embodiment, an activity analysis service 716 may be implemented to analyze the activity repository 709 for cost, efficiency and quality of service delivery. For example, activities instantiated using structured templates that belong to a specific process may be used to supply improved estimates of the number of people, tools, and amount of time, i.e. cost, involved in particular kinds of IT service delivery activities over many instances by customer by calendar period.

In one embodiment, activity pattern recognition service 715 may be implemented to analyze activities in the activity repository 709 by detection of patterns. The patterns can include common extensions to structured activities using certain tools or resources, or additional steps taken in context of a structure activity. The analysis may be used to generate recommendations to changes to structured templates, or for automation candidates.

In one embodiment, a search engine 706 may be implemented to comprise API's, UI's, and services for retrieval of activities that match search strings entered manually by a user or by automated services.

In one embodiment, a repository for storing roles and specializations definitions that are associated with structured activity templates may be deployed on an activity repository 709. The information stored in this repository may include role/specialization name, role description, skills, and capabilities. The activity agent 705 may search this repository dynamically during activity instantiation to find people that are matched to a required role or specialization to populate activity participants.

In one embodiment, a repository 710 for storing tools descriptions and locations, e.g. URI, local .exe, that can be associated with an activity may be deployed on an activity backend. In one embodiment, a repository 710 for storing resource templates that can be associated with an activity, e.g. service plan, service contract, report may be deployed on an activity backend.

In one embodiment, a calendar engine 713 may be deployed to monitor retrieve, and populate calendar entries as may be determined by actions taken in the context of an activity.

In one embodiment, a reporting service 714 may be deployed to generate reports based on analysis and user directed requests for information.

In one embodiment, system event notification engine 712 may be deployed to monitor system events and communicate the events to the activity repository 709.

In one embodiment, activity notification engine 711 may be deployed to track changes in activity repository 709.

In one embodiment, an activity context resource 718 may be deployed as a default for example, on activity resource 709. In one embodiment, the activity context resource 718 may be embodied as an XML document that contains activity context information which could be passed to tools launched within an activity, effectively transferring relevant contextual information to the tool. In one embodiment, the activity context resource 718 may address the data using XPATH to read in values to fields or write back user entered values into the resource. The ACR may be created during instantiation of (sub)activities.

Certain ones of the operations described herein may be performed in parallel as well as sequentially. In alternative embodiments, certain of the operations may be performed in a different order, modified or removed. Furthermore, many of the components have been described separately for purposes of illustration. Such components may be integrated into a fewer number of components or divided into a larger number of components. Additionally, certain operations described as performed by a specific component may be performed by other components.

One or more of the embodiments described herein may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and nonvolatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain computer embodiments can take the form of an entirely hardware embodiment, an entirely software embodiment or an embodiment containing both hardware and software elements. In one embodiment, the invention is implemented in software, which includes but is not limited to firmware, resident software, microcode, etc. Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Elements of the invention that are in communication with each other need not be in continuous communication with each other, unless expressly specified otherwise. In addition, devices that are in communication with each other may communicate directly or indirectly through one or more intermediaries. Additionally, a description of an embodiment with several elements in communication with each other does not imply that all such components are required. On the contrary a variety of optional elements are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

Finally, although some exemplary embodiments of the present invention have been described in the context of Information Technology (IT), the present invention applies much more broadly, as for example, in the context of any complex service delivery, e.g. business consulting services and the like.

Therefore, the foregoing description of the embodiments has been presented for the purposes of illustration and description. It is not intended to be exhaustive or to limit the embodiments to the precise form disclosed. Many modifications and variations are possible in light of the above teaching.

The invention claimed is:

1. A computer implemented method of managing service delivery, said method including:

importing and instantiating a template workflow including work activities;

creating a new workflow via a processor by extending the work activities with a sub-activity and ad hoc actions taken by one or more activity participant;

prioritizing the work activities in the new workflow;

determining whether an incomplete work activity of the work activities is not going to be completed in time based on past work activities in the new workflow and a current priority of the incomplete work activity;

automatically escalating the current priority of the incomplete work activity if the incomplete work activity is not going to be completed in time;

detecting patterns in an activity repository, the patterns including common extensions to structured activities using tools or resources, or additional steps taken in context of a structured activity;

adding a new work activity to the new workflow based on the patterns; and storing the new workflow in a storage device.

2. The method of claim 1, wherein said extending of the work activities includes associating:
   a person with the sub-activity;
   a resource with the sub-activity;
   a tool with the sub-activity; and
   a scheduled event with the sub-activity.

3. The method of claim 2, wherein said associating of the person with the sub-activity includes:
   associating the person from specialists repository;
   automatically associating the person from the template workflow;
   automatically associating the person given a role assigned to a particular activity type;
   automatically associating the person based on interaction context, the interaction context including at least one of an instant message, an email, and a telephone call; and
   automatically associating the person based on a previously completed activity via skills and activity matching.

4. The method of claim 2, wherein said associating of the resource with the sub-activity includes:
   attaching the resource from a resource template repository;
   automatically attaching the resource as defined by the template workflow; and
   automatically attaching the resource based on a user action taken in context of an activity, the user actions including downloading a file from the Internet and creating a document.

5. The method of claim 2, wherein said associating of the tool with the sub-activity includes:
   attaching the tool from a tools repository;
   automatically attaching the tool based on activity type;
   automatically attaching the tool based on the template workflow; and
   automatically attaching the tool based on a user action taken in context of an activity.

6. The method of claim 1, wherein said extending of the work activities includes retrieving the sub-activity from at least one of an email, a web document, and an activity repository.

7. A computer implemented method of managing service delivery, said method including:
   importing and instantiating a template workflow including work activities from a storage device;
   creating a new workflow via a processor by extending the work activities with a sub-activity and ad hoc actions taken by one or more activity participant, wherein the ad hoc actions are mediated via one or more activity agent;
   prioritizing the work activities in the new workflow via the processor;
   determining via an activity analysis service whether an incomplete work activity of the work activities is not going to be completed in time based on past work activities in the new workflow and a current priority of the incomplete work activity;
   automatically escalating the current priority of the incomplete work activity via a statistical analysis system if the incomplete work activity is not going to be completed in time;
   detecting patterns in an activity repository, the patterns including common extensions to structured activities using tools or resources, or additional steps taken in context of a structured activity;
   adding a new work activity to the new workflow based on the patterns; and
   storing the new workflow in the storage device.

8. The method of claim 7, wherein said extending of the work activities includes associating:
   a person with the sub-activity;
   a resource with the sub-activity;
   a tool with the sub-activity; and
   a scheduled event with the sub-activity.

9. The method of claim 8, wherein said associating of the person with the sub-activity includes:
   associating the person from specialists repository;
   automatically associating the person from the template workflow;
   automatically associating the person given a role assigned to a particular activity type;
   automatically associating the person based on interaction context, the interaction context including at least one of an instant message, an email, and a telephone call; and
   automatically associating the person based on a previously completed activity via skills and activity matching.

10. The method of claim 8, wherein said associating of the resource with the sub-activity includes:
    attaching the resource from a resource template repository;
    automatically attaching the resource as defined by the template workflow; and
    automatically attaching the resource based on a user action taken in context of an activity, the user actions including downloading a file from the Internet and creating a document.

11. The method of claim 8, wherein said associating of the tool with the sub-activity includes:
    attaching the tool from a tools repository;
    automatically attaching the tool based on activity type;
    automatically attaching the tool based on the template workflow; and
    automatically attaching the tool based on a user action taken in context of an activity.

12. The method of claim 7, wherein said extending of the work activities includes retrieving the sub-activity from at least one of an email, a web document, and an activity repository.

13. A system for managing service delivery, said system including:
    a storage device including template workflows, the template workflows including work activities; and
    a processor for creating a new workflow by extending the work activities in one of the template workflows with a sub-activity and ad hoc actions taken by one or more activity participant, the new workflow including prioritized work activities;

an activity analysis service for generating estimated completion times of on-going activities of the work activities;

a statistical analysis system for automatically escalating at least one of the on-going activities based on the estimated completion times;

an activity pattern recognition service for detecting patterns in an activity repository, the patterns including common extensions to structured activities using tools or resources, or additional steps taken in context of a structured activity, and adding a new work activity to the new workflow based on the patterns.

14. The system of claim 13, wherein said processor extends the work activities by associating:
   a person with the sub-activity;
   a resource with the sub-activity;
   a tool with the sub-activity; and
   a scheduled event with the sub-activity.

15. The system of claim 14, wherein said processor associates the person with the sub-activity by:
   associating the person from specialists repository;
   automatically associating the person from the template workflow;
   automatically associating the person given a role assigned to a particular activity type;
   automatically associating the person based on interaction context, the interaction context including at least one of an instant message, an email, and a telephone call; and
   automatically associating the person based on a previously completed activity via skills and activity matching.

16. The system of claim 14, wherein said processor associates the resource with the sub-activity by:
   attaching the resource from a resource template repository;
   automatically attaching the resource as defined by the template workflow; and
   automatically attaching the resource based on a user action taken in context of an activity, the user actions including downloading a file from the Internet and creating a document.

17. The system of claim 14, wherein said processor associates the tool with the sub-activity by:
   attaching the tool from a tools repository;
   automatically attaching the tool based on activity type;
   automatically attaching the tool based on the template workflow; and
   automatically attaching the tool based on a user action taken in context of an activity.

18. A computer program product for managing service delivery, said computer program product comprising:
   a computer readable storage medium;
   first program instructions to import and instantiate a template workflow, the template workflow including work activities;
   second program instructions to create a new workflow by extending the work activities with a sub-activity and ad hoc actions taken by one or more activity participant;
   third program instructions to prioritize the work activities in the new workflow;
   fourth program instructions to determine whether an incomplete work activity of the work activities is not going to be completed in time based on past work activities in the new workflow and a current priority of the incomplete work activity;
   fifth program instructions to automatically escalate the current priority of the incomplete work activity if the incomplete work activity is not going to be completed in time;
   sixth program instructions to detect patterns in an activity repository, the patterns including common extensions to structured activities using tools or resources, or additional steps taken in context of a structured activity;
   seventh program instructions to add a new work activity to the new workflow based on the patterns;
   eighth program instructions to store the new workflow in a storage device,
   wherein said first program instructions, said second program instructions, said third program instructions, said fourth program instructions, said fifth program instructions, said sixth program instructions, said seventh program instructions, and said eighth program instructions are stored on said computer readable storage medium.

19. The method of claim 1, further including automatically escalating an activity based on a scheduled event.

20. The method of claim 19, wherein the scheduled event is a backup, and wherein the activity is an activity that is required to precede the backup.

* * * * *